(12) United States Patent
Smirnov (10) Patent No.: US 8,015,577 B2
(45) Date of Patent: Sep. 6, 2011

(54) DISK CHUCKING APPARATUS AND DISK DRIVE HAVING THE SAME

(75) Inventor: Viatcheslav Smirnov, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 796 days.

(21) Appl. No.: 12/149,518

(22) Filed: May 2, 2008

(65) Prior Publication Data

US 2008/0282272 A1 Nov. 13, 2008

(30) Foreign Application Priority Data

May 7, 2007 (KR) ........................ 10-2007-0043904

(51) Int. Cl.
*G11B 17/03* (2006.01)
(52) U.S. Cl. ..................................................... 720/707
(58) Field of Classification Search .................. 720/707, 720/604, 702, 623, 610, 703, 614, 600, 704, 720/706, 603, 619, 712, 605
See application file for complete search history.

(56) References Cited

U.S. PATENT DOCUMENTS

| | | | | |
|---|---|---|---|---|
| 7,313,801 | B2 * | 12/2007 | Choi et al. | 720/709 |
| 7,667,362 | B2 * | 2/2010 | Shiga | 310/91 |
| 2006/0048176 | A1 * | 3/2006 | Choi et al. | 720/707 |
| 2009/0007165 | A1 * | 1/2009 | Smirnov et al. | 720/604 |
| 2009/0106782 | A1 * | 4/2009 | Smirnov et al. | 720/604 |
| 2009/0119690 | A1 * | 5/2009 | Smirnov et al. | 720/604 |

FOREIGN PATENT DOCUMENTS

JP 2004-171706 6/2004

OTHER PUBLICATIONS

Korean Patent Office Action, mailed Aug. 14, 2008 and issued in corresponding Korean Patent Application No. 10-2007-0043904.

* cited by examiner

*Primary Examiner* — Allen Cao (57) ABSTRACT

A disk chucking apparatus and a disk drive having the same are disclosed. The disk chucking apparatus may include: a chuck base having a plurality of holding portions, a plurality of chuck pins which are inserted in the holding portions such that the chuck pins protrude out from the chuck base, and a plurality of elastic members which elastically support the chuck pins, where each of the elastic members elastically supports a pair of adjacent chuck pins concurrently. When this disk chucking apparatus is utilized, the center of the disk and the center of the chuck base can be aligned with greater ease, since forces can be transferred uniformly to the center of disk.

32 Claims, 13 Drawing Sheets

DISK CHUCKING APPARATUS AND DISK DRIVE HAVING THE SAME

CROSS-REFERENCE TO RELATED-APPLICATIONS

This application claims the benefit of Korean Patent Application No. 10-2007-0043904 filed with the Korean Intellectual Property Office on May 7, 2007, the disclosure of which is incorporated herein by reference in its entirety.

BACKGROUND

1. Technical Field

The present invention relates to a disk chucking apparatus and a disk drive having the disk chucking apparatus.

2. Description of the Related Art

In general, a disk drive may include a deck base which forms the main body, a means for loading or unloading a disk onto or from the deck base, a means for rotating the disk loaded onto the loading/unloading means at a particular speed, and a means for recording or retrieving information onto or from the recording surface of the disk while traversing across the radius of the disk rotated by the rotating means. Several types of disk drives are known to the public, examples of which may include disk drives in which a disk is loaded and unloaded while placed on a tray, or in which a disk is encased in a cartridge that is received into or ejected from the deck base.

A spindle motor may be employed as the means for rotating the disk can be a spindle motor, while a pickup unit may typically be used as the means for recording or retrieving information onto/from the recording surface of the disk. Also, a disk chucking device for securing the disk may be equipped on the deck base, where the disk may be inserted onto the chuck base and secured by chuck pins, etc.

An important matter in such a disk drive is to align the center of the disk mounted on the chuck base with the center of the chuck base itself. If the centers of the chuck base and the disk are misaligned, the high-speed rotation of the disk can further increase the eccentricity between the centers and can cause various vibrations and noise. Also, if the centers of the chuck base and the disk are not aligned, problems may occur that prevent the pickup unit from accurately recording or retrieving information.

Figure 1:
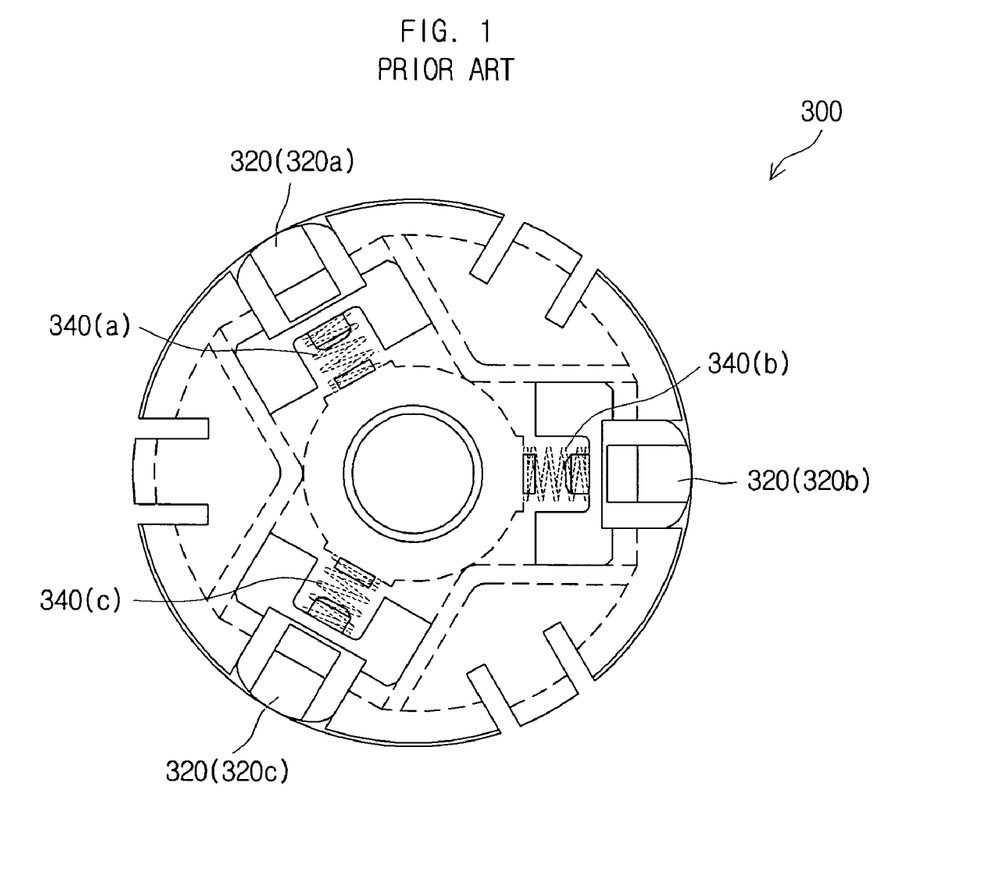
FIG. 1 is a plan view illustrating a disk chucking apparatus according to the related art.

As illustrated in FIG. 1, a disk chucking apparatus 300 according to the related art may have one elastic member 340 elastically pressing just one chuck pin 320, so that deviations in the elasticity of the elastic members may be directly reflected, causing corresponding deviations in forces applied to the chuck pins 320.

SUMMARY

An aspect of the invention is to provide a disk chucking apparatus and a disk drive having the disk chucking apparatus, in which the center of a disk and the center of the chuck base can be aligned easily.

Another aspect of the invention is to provide a disk chucking device and a disk drive having the disk chucking apparatus, in which durability is increased.

One aspect of the invention provides a disk chucking apparatus that includes a chuck base having a plurality of holding portions, a plurality of chuck pins which are inserted in the holding portions such that the chuck pins protrude out from the chuck base, and a plurality of elastic members which elastically support the chuck pins, where each of the elastic members elastically supports a pair of adjacent chuck pins concurrently.

Another aspect of the invention provides a disk chucking that includes a chuck base having a plurality of holding portions, a plurality of chuck pins which are inserted in the holding portions such that the chuck pins protrude out from the chuck base, and a plurality of elastic members which elastically support the chuck pins, where each of the chuck pins is pressed by an adjacent pair of elastic members concurrently.

Embodiments of the disk chucking apparatus according to certain embodiments of the invention may include one or more of the following features. For example, the chuck pin may include a contact portion which protrudes out from the holding portion to be in contact with a disk, and a body portion which contacts the elastic member, where the contact portion may include an upper inclined portion and a lower inclined portion formed in connection with the upper inclined portion. The body portion may include a pair of pressing surfaces which contact the elastic member at an angle to a direction of motion of the chuck pin. Also, the pressing surfaces may be symmetrical with respect to the direction of motion of the chuck pin.

The chuck base may include a center hole through which a shaft may be inserted, and the holding portions may be formed around the center hole in constant intervals. Also, the chuck base may include a center hole through which a shaft may be inserted, where an elastic piece may be formed at a position symmetrical with the holding portion about the center hole. The elastic piece may include a bending portion having elasticity.

The chuck base may include a turntable, where a cushion member can be formed on the turntable that contacts a disk. The holding portions and the chuck pins inserted in the holding portions may be formed in intervals of 120 degrees.

The elastic member may be a helical compression spring, and both ends of the elastic member may be secured to one of the chuck pins. The elastic member may be a circular type or a helical coil type of torsion spring, where a part of the torsion spring may be inserted and secured in a securing groove formed in the chuck pin.

A further aspect of the invention provides a disk drive that includes a disk chucking apparatus and a motor configured to provide a rotating force to the disk chucking apparatus, where the disk chucking apparatus includes a chuck base having a plurality of holding portions, a plurality of chuck pins which are inserted in the holding portions such that the chuck pins protrude out from the chuck base, and a plurality of elastic members which elastically support the chuck pins, where each of the elastic members elastically supports a pair of adjacent chuck pins concurrently.

Yet another aspect of the invention provides a disk drive that includes a disk chucking apparatus and a motor configured to provide a rotating force to the disk chucking apparatus, where the disk chucking apparatus includes a chuck base having a plurality of holding portions, a plurality of chuck pins which are inserted in the holding portions such that the chuck pins protrude out from the chuck base, and a plurality of elastic members which elastically support the chuck pins, where each of the chuck pins is pressed by an adjacent pair of elastic members concurrently.

Additional aspects and advantages of the present invention will be set forth in part in the description which follows, and in part will be obvious from the description, or may be learned by practice of the invention.

DETAILED DESCRIPTION

The disk chucking apparatus and disk drive having the disk chucking apparatus according to certain embodiments of the invention will be described below in more detail with reference to the accompanying drawings. Those elements that are the same or are in correspondence are rendered the same reference number regardless of the figure number, and redundant explanations are omitted.

Figure 2:
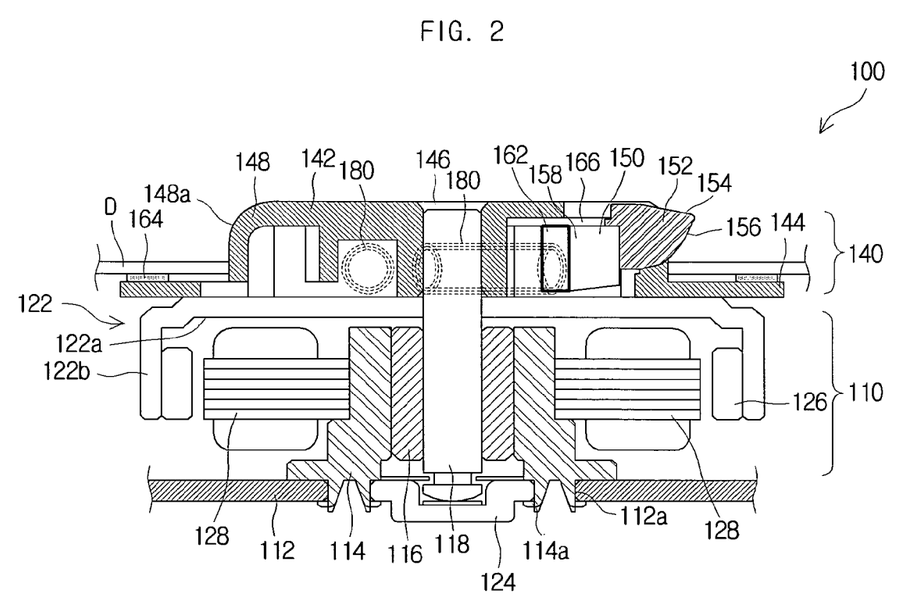
FIG. 2 is a cross-sectional view illustrating a disk drive according to an embodiment of the invention.

FIG. 2 is a cross-sectional view illustrating a disk drive according to an embodiment of the invention. Referring to FIG. 2, a disk drive 100 according to an embodiment of the invention may include a disk chucking 140 apparatus in which a disk (D) may be inserted and secured, and a motor 100 that provides a driving force to the disk chucking apparatus 140. The disk (D) secured by the disk chucking apparatus 140 may be rotated at a particular speed by the motor 100, to allow a pickup device (not shown) to retrieve information recorded on the disk or record information onto the disk.

The motor 100 may provide a driving force to the disk chucking apparatus 140. The motor 100 may include a rotor coupled to the disk chucking apparatus 140 to rotate together with the disk chucking device apparatus 140, and a stator for providing a rotational force to the rotor.

The stator may include a bush 114 affixed to a frame 112, and coils 128 secured around the perimeter of the bush 114. At an inner part of the bush 114, a sleeve 116 may be included, which may support a shaft 118 and allow smoother rotation.

The bush 114 to be inserted in a hole 112a of the frame 112 may include a securing protrusion 114a at one end. The securing protrusion may be inserted into the hole 112a of the frame 112 and then folded, such that the bush 114 may be affixed to the frame 112. The coils 108 may be equipped around the perimeter of the bush 114, where an electric current may be supplied to the coils 128, which may then form an electric field. The coils 128 can be arranged adjacent to magnets 126, which may be affixed to the rotor holder 122.

Also, a finishing plate 124 may be inserted and secured in the center of the bush 114. The finishing plate 124 may prevent foreign substances from infiltrating the inside of the bush 114, while supporting one end of the shaft 118.

The rotor may include the shaft 118, which may be supported by the sleeve 116; the rotor holder, which may be inserted over the shaft 118 and which may support the disc chucking apparatus 140; and magnets 126, which may be secured to the inner perimeter of the rotor holder 122.

The shaft 118 may rotate together with the rotor holder 122 and transfer the rotational force to the disk chucking apparatus 140. One end of the shaft 118 may be supported by the finishing plate 124, while the other end may be inserted into the center hole 146 of the chuck base 142.

The rotor holder 122 may be inserted into the shaft 118 to rotate together with the shaft 118 and the disk chucking apparatus 140, and may be shaped as a cup having a circular horizontal cross section. The rotor holder 122 may be open downwards, and may include a cover portion 122a and a circumference portion 122b extending along the circumference of the cover portion 112a.

The cover portion 122a can generally be shaped as a circular plate, and an upper surface of the cover portion 122a may be in contact with the disk chucking apparatus 140. The circumference portion 122b may encompass the perimeter of the coils 128, and the magnets 126 may be secured in the inner perimeter of the circumference portion 122b. Electromagnetic forces may be generated due to the interaction between the magnetic field formed by the magnets 126 and the electrical field formed by the coils 126, and these electromagnetic forces may rotate the rotor and the disk chucking apparatus 140.

While FIG. 2 illustrates a spindle motor as an example of a device that provides a driving force to the disk chucking apparatus 140, the invention is not limited to this example, and it is to be appreciated that various types of driving device can be used, such as a brushless direct motor, etc.

The disk chucking apparatus 140 according to an embodiment of the invention will now be described below with reference to FIG. 3.

Figure 3:
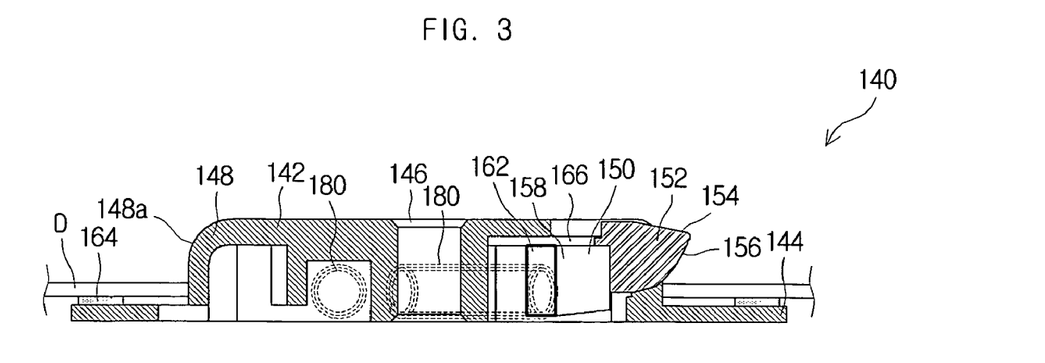
FIG. 3 is a cross-sectional view illustrating a disk chucking apparatus according to an embodiment of the invention.
Figure 4:
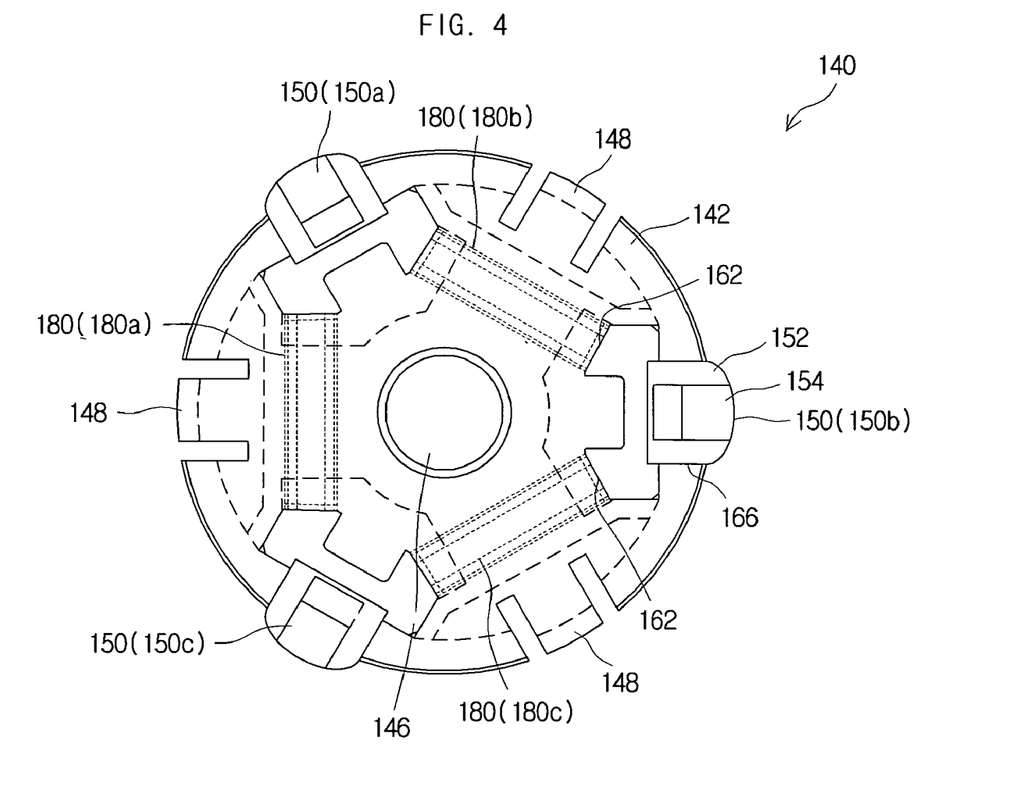
FIG. 4 is a plan view illustrating chuck pins protruding outwards in a disk chucking apparatus according to an embodiment of the invention.
Figure 5:
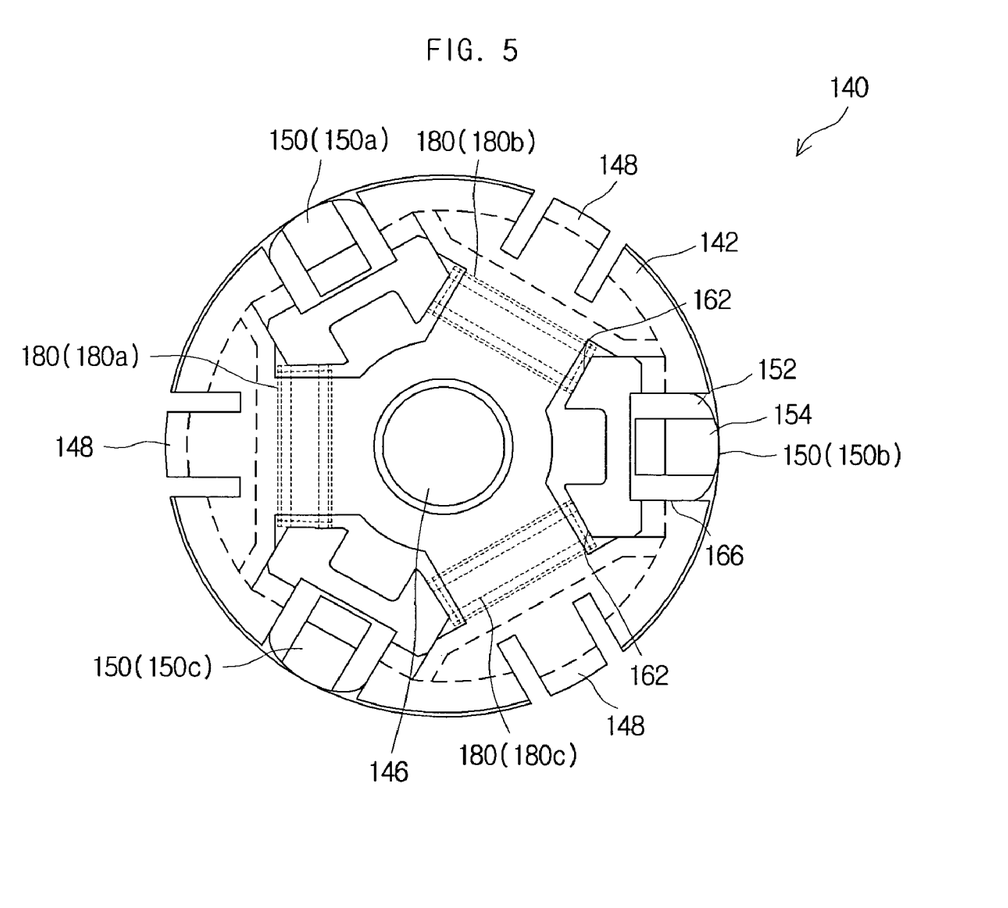
FIG. 5 is a plane view illustrating chuck pins inserted inwards in a disk chucking apparatus according to an embodiment of the invention.

FIG. 3 is a cross-sectional view of a disk chucking apparatus according to an embodiment of the invention. In FIG. 3, a chuck pin 150 is illustrated which protrudes outwards from the chuck base 142. FIG. 4 and FIG. 5 are plan views illustrating a disk chucking apparatus according to an embodiment of the invention.

The disk chucking apparatus 140 may be provided with a driving force by the shaft 118 inserted in a center hole 146 formed in the middle, to rotate at a particular speed. The disk chucking apparatus 140 may include a chuck base 142 into which the shaft 118 may be inserted, a turntable 144 which may be formed on the rear face of the chuck base 142, chuck pins 150 which may be inserted into the chuck base 142 such that the chuck pins 150 protrude outward from the chuck base 142, and elastic members 180 elastically supporting the chuck pins 150.

The chuck base 142 may have a circular shape (see FIGS. 4 and 5), and may have a center hole 146 formed in the middle. The shaft 118 can be inserted through the center hole 146. Holding portions 166 may be formed around the center hole 146 in constant intervals, through which the chuck pins 140 may be inserted.

The chuck pins 150 may be inserted into the holding portion 166 such as to allow the chuck pins 150 to protrude outwards. The chuck pins 150 located in the inner side of the holding portions 166 may protrude outwards due to the elastic forces applied by the elastic members 180. When a disk (see D of FIG. 2) is mounted, the chuck pins 150 may contract into the holding portions 166, to press the inner perimeter of the disk (D).

The turntable 144 may be placed at the bottom of the chuck base 142, to support the bottom surface of the disk (D), and a cushion member 164 may be placed in a portion of the turntable 144. The cushion member may be made of a rubber, etc., to support the disk (D) to a particular height.

Elastic pieces 148 may be formed at positions symmetrical to the chuck pins 150 about the center hole 146. The elastic pieces 146 may be formed slightly larger than the diameter of the chuck base 142, so that when the disk is mounted, the bending portions 148a on the elastic pieces 148 may be slightly bent, providing the disk with elastic forces. While FIG. 4 and FIG. 5 illustrate examples in which the elastic pieces 148 are formed around the center hole 146 in intervals of about 120 degrees, the embodiment is not thus limited, and it is to be appreciated that the elastic pieces 148 can be formed in various angles.

The chuck pins 150 may be inserted into the holding portions 166 and may protrude outwards due to the elastic forces applied by the elastic members 180. As illustrated in FIG. 3, the contact portions 152 may press against the inner perimeter of the disk (D). As illustrated in FIG. 4 and FIG. 5, three chuck pins 140 may be arranged around the center hole 146 at angles of 120 degrees. In such a case, there may also be three holding portions 166 and three chuck pins 150 inserted in the holding portions 166 arranged at 120 degree angles. Thus, the chuck pins 150 and the elastic members 180 that elastically support the chuck pins 140, can be positioned in a generally triangular arrangement.

While the disk chucking apparatus 140 described in this embodiment is illustrated with three elastic members 180 and three chuck pins 150, the invention is not thus limited, and it is to be appreciated that any of various numbers of chuck pins 150 and elastic members 180 may be included according to design conditions, and so on. For example, four, five, or six chuck pins 140 may be arranged in particular intervals.

A chuck pin 150 can be pressed simultaneously by a pair of adjacent elastic members 180. For example, the chuck pin 150a may be pressed by a pair of adjacent elastic members 180a, 180b simultaneously, and the chuck pin 150b may be pressed by a pair of adjacent elastic members 180b, 180c simultaneously. Because each of the chuck pins 150a, 150b, 150c are pressed by two adjacent elastic members 180a, 180b, 180c simultaneously, even if there are deviations in elasticity for each of the elastic members, the deviations can be cancelled out to a certain degree.

Both ends of the elastic member 180 may contact different chuck pins 150, and the elastic members 180 may press the adjacent chuck pins simultaneously. For example, the elastic member 180a may press the pair of chuck pins 150a, 150c and the elastic member 180b may press the two chuck pins 150a, 150b simultaneously. Although the elastic members 180 having the same elasticity are used, certain differences may occur during fabrication. Such differences in elasticity can cause misalignment between the center of the disk and the center of the chuck base 142. However, in the disk chucking apparatus 140 according to this embodiment, one elastic member 180 may simultaneously press the pair of adjacent chuck pins 150, and one chuck pin 150 can be pressed simultaneously by the forces applied by the pair of adjacent elastic members 180. As such, since the elastic members 180 may be linked together by way of the chuck pins 150, the differences in elasticity of the elastic members 180 can be distributed and a self-adjusting configuration can be provided.

Figure 6:
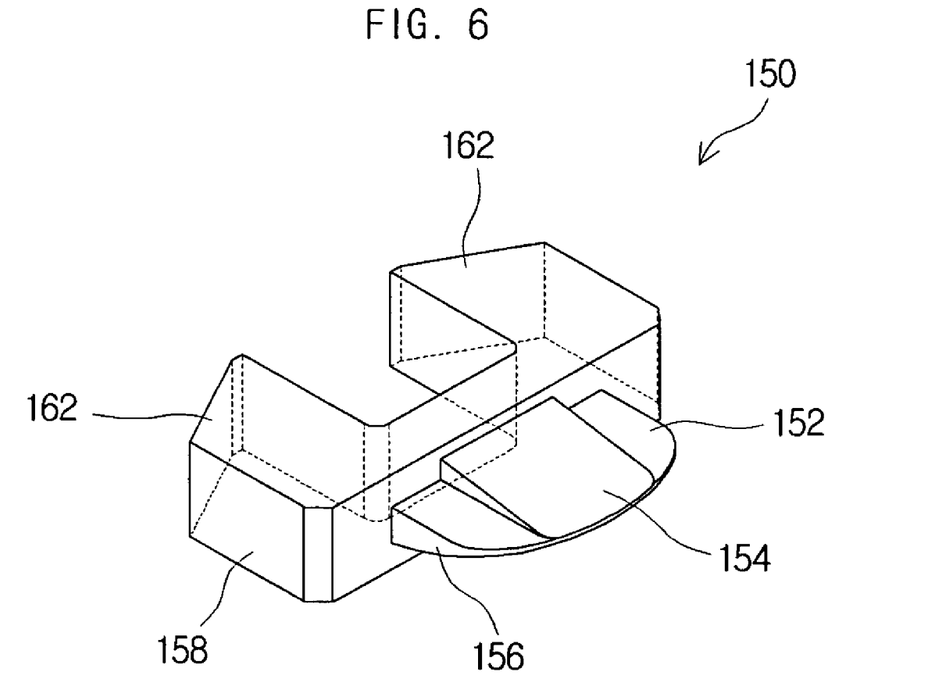
FIG. 6 is a perspective view illustrating a chuck pin according to an embodiment of the invention.

FIG. 6 is a perspective view illustrating a chuck pin 150 according to an embodiment of the invention. Referring to FIG. 6, the chuck pin 150 according to an embodiment of the invention may include a contact portion 152, of which a front end may be in contact with a disk, and a body portion 158, of which a rear surface may be pressed by the elastic member 180.

As illustrated in FIG. 4, even if a disk is not mounted, the front end of the contact portion 152 of each of the chuck pins pressed by the elastic members 180 may protrude outwards. When a disk is mounted, the front end of the contact portion 152 may contract into the holding portion 166. The contact portion 152 may include an upper inclined portion 154 and a lower inclined portion 156. The upper inclined portion 154 may be formed in such a way that allows a disk to be mounted easily, where an inner perimeter of the disk may move along the upper inclined portion to force the chuck pins 150 to retreat. The lower inclined portions 156 may be formed in such a way that allows the disk to be mounted/withdrawn easily, where the inner perimeter of the disk may move along the lower inclined portion to withdraw the chuck pins 150.

The body portion 158 may be guided by the holding portion 166, and pressing surfaces 162 may be formed in the rear of the body portion 158. A pair of pressing surfaces 162 may be formed on the body portion 158 in symmetry with respect to the direction of motion of the chuck pin 150 (depicted by the large shaded arrows), and may be formed in particular angles. While the angles of inclination may be changed according to the angles and the number of the chuck pins 150, FIG. 4 and FIG. 6 illustrate examples in which the angles are about 60 degrees. It is to be appreciated that these angles of the pressing surfaces can be changed according to the securing method of the elastic members 180, etc.

Figure 7:
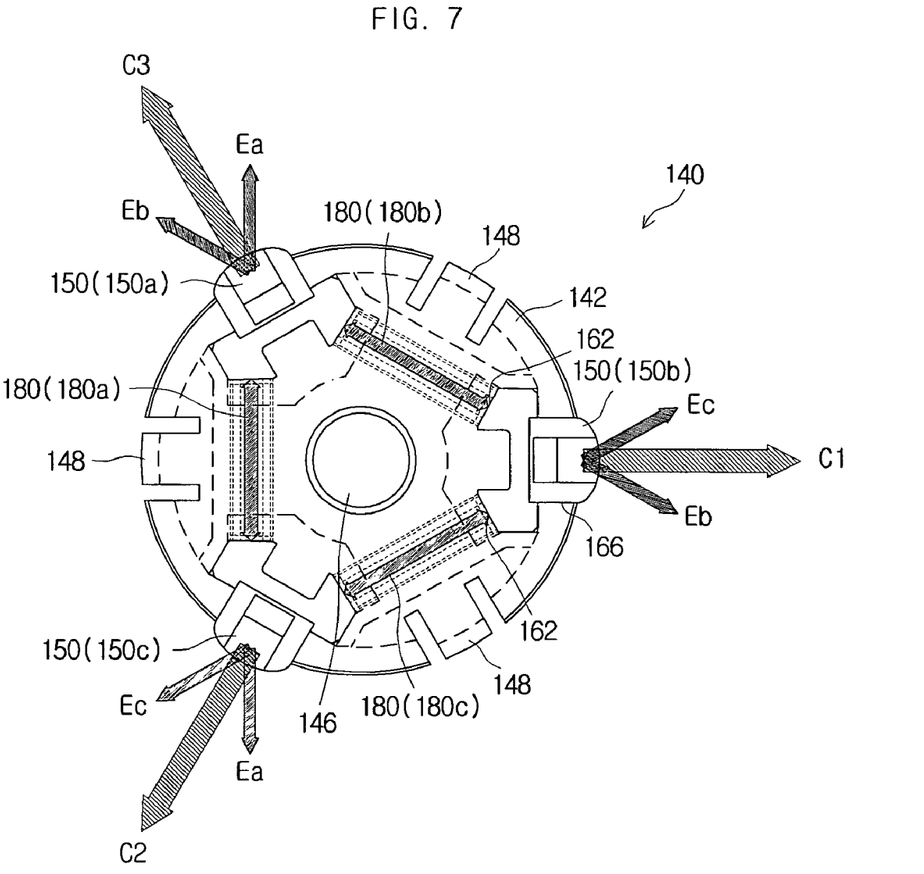
FIG. 7 is a diagram illustrating the forces applied on the chuck pins in a disk chucking apparatus according to an embodiment of the invention.

FIG. 7 is a diagram illustrating the forces applied on the chuck pins in a disk chucking apparatus according to an embodiment of the invention. Each of the forces described below is represented by a vector quantity.

In FIG. 7, the forces applied to a disk by the chuck pins 150 are C1, C2, and C3. Here, force C1 can be divided into force Eb applied by the elastic member 180b and force Ec applied by the elastic member 180c. Likewise, force C2 can be divided into force Ea applied by the elastic member 180a and force Ec applied by the elastic member 180c, and also force C3 can be divided into force Ea applied by the elastic member 180a and force Ec applied by the elastic member 180b. The angles between force Cn (n=1, 2, 3) and the forces applied by the elastic members (Ea, Eb, Ec) may be 30 degrees.

As described above, although the elastic members 180a, 180b, and 180c are fabricated to have the same quality, certain errors may occur during fabrication. If each of the modulus of elasticity is subject to a 20% error, for example, Ea=0.75N (average), Eb=0.64N (−20%), and Ec=0.86N (+20%), C1, C2, and C3 may be as represented below. Here, the numbers have been truncated to two decimal digits.

$C1 = Eb \cos 30° + Ec \cos 30° = (Eb+Ec)\cos 30° = (0.64+0.86)\cos 30° = 1.29N$ $C2 = Ea \cos 30° + Ec \cos 30° = (Ea+Ec)\cos 30° = (0.75+0.86)\cos 30° = 1.39N$ $C3 = Ea \cos 30° + Eb \cos 30° = (Ea+Eb)\cos 30° = (0.75+0.64)\cos 30° = 1.20N$ As indicated in the above formulas, if each of the modulus of elasticity is in error by 20%, the maximum error in the forces C1, C2, C3 applied by the chuck pins 150 is 0.19N (1.39N−1.2N=0.19N).

Consider the case where an elastic member 340 presses only one chuck pin 320, as in the example illustrated in FIG. 1, and where the error in the modulus of elasticity of the elastic member 320 is equal to 20%, as in the above. For example, if the modulus of elasticity in the elastic member 340a is equal to 1.0N (−20%), the modulus of elasticity of the elastic member 340b is equal to 1.2N (average), and the modulus of elasticity of the elastic member 340c is equal to 1.4N (+20%), the differences in the forces applied by the elastic members may not be cancelled out and instead may be transferred unaltered, so that the force applied to the chuck pin 320a may equal 1.0N, the force applied to the chuck pin 320b may equal 1.2N and the force applied to the chuck pin 320c may equal 1.4N. Therefore, the maximum error in the forces applied to the chuck pins may be equal to 0.4N (1.4N−1.0N=0.4N).

In the disk chucking apparatus according to this embodiment, since the chuck pins 150 may be linked by the elastic members 180, and a chuck pin may be pressed by a pair of adjacent elastic members, as noted above, the differences in the elastic force of the elastic members can be cancelled out. Hence, if the errors in the modulus of elasticity are the same, the maximum error in a force applied to a chuck pin may equal 0.19N, which is smaller than the error (0.4N) for the case where each elastic member presses one chuck pin. Therefore, the disk chucking apparatus 140 according to this particular embodiment allows the centers of the chuck base and the disk to be aligned more easily.

Also, as adjacent chuck pins are linked to each other by elastic members, the disk chucking apparatus according to this particular embodiment allows differences in the modulus of elasticity of elastic members to be cancelled out until the forces applied to the chuck pins are the same. Of course, the friction and surface characteristics according to the arrangement of the chuck pins may also affect the forces applied on the chuck pins.

Also, when the modulus of elasticity is 0.75N, 0.64N, and 0.86N, respectively, the forces applied on the chuck pins may be 1.2N, 1.29N, and 1.39N. As such, the forces obtained are comparable to those for the case in which the modulus of elasticity is 1.0N, 1.2N, and 1.4N for each elastic member. Therefore, the disk chucking apparatus according to this particular embodiment makes it possible to obtain greater forces from elastic members having smaller moduli of elasticity. Because the modulus of elasticity can be lower in each of the elastic members, the operation reliability of the springs, as well as the durability of the disk chucking apparatus can be improved.

Figure 8:
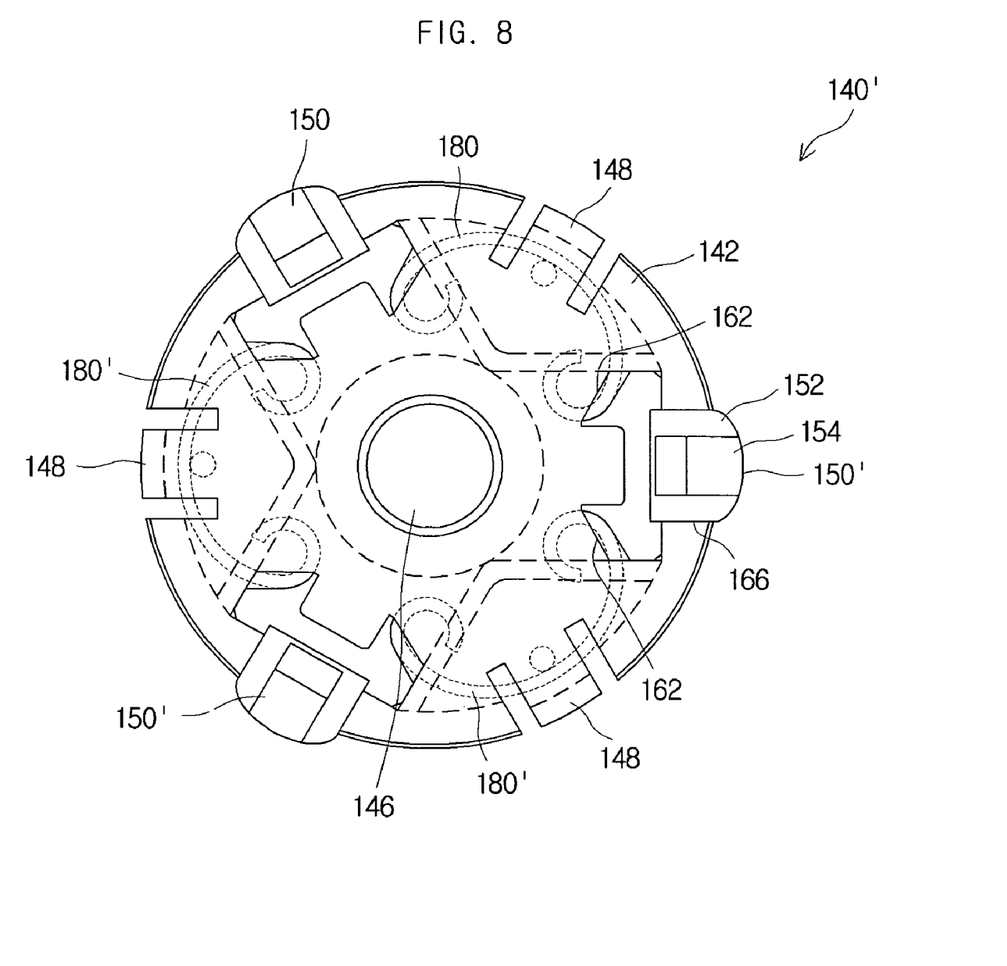
FIG. 8 is a plan view illustrating chuck pins protruding outwards in a disk chucking apparatus according to another embodiment of the invention.
Figure 9:
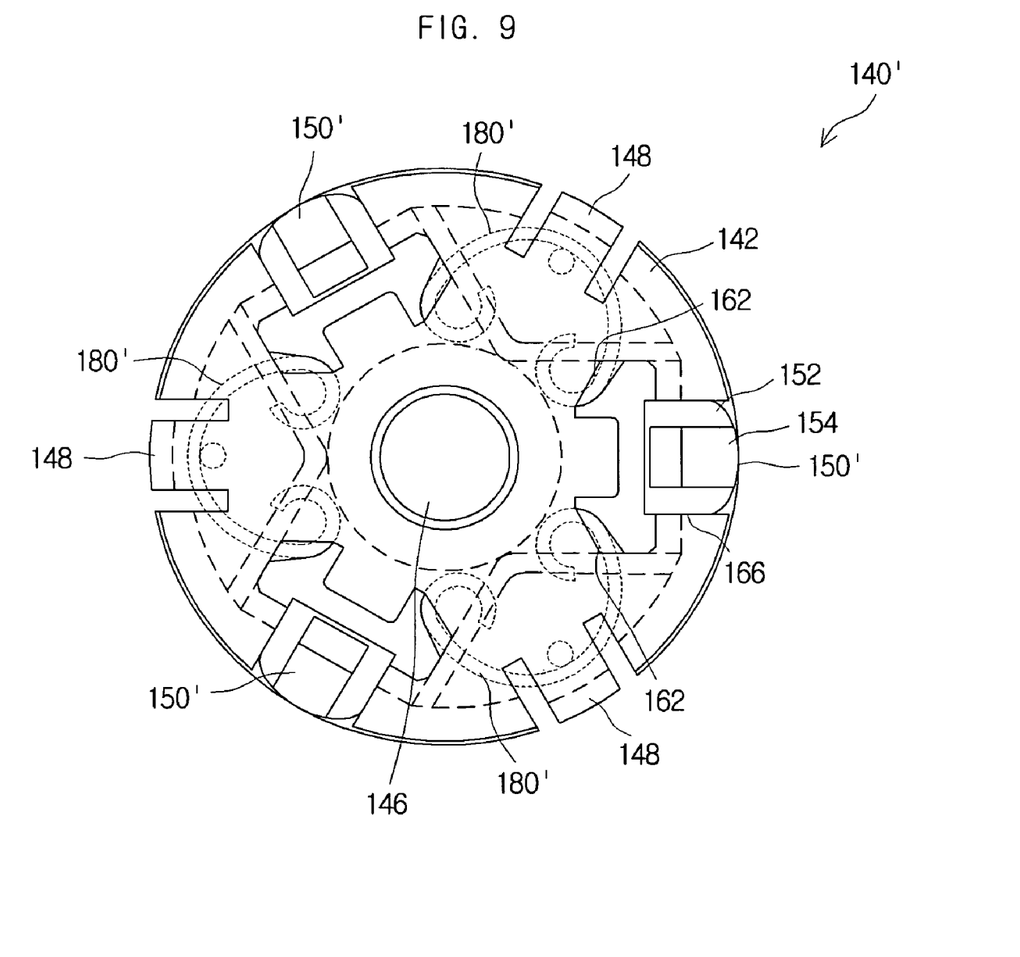
FIG. 9 is a plane view illustrating chuck pins inserted inwards in a disk chucking apparatus according to another embodiment of the invention.
Figure 10:
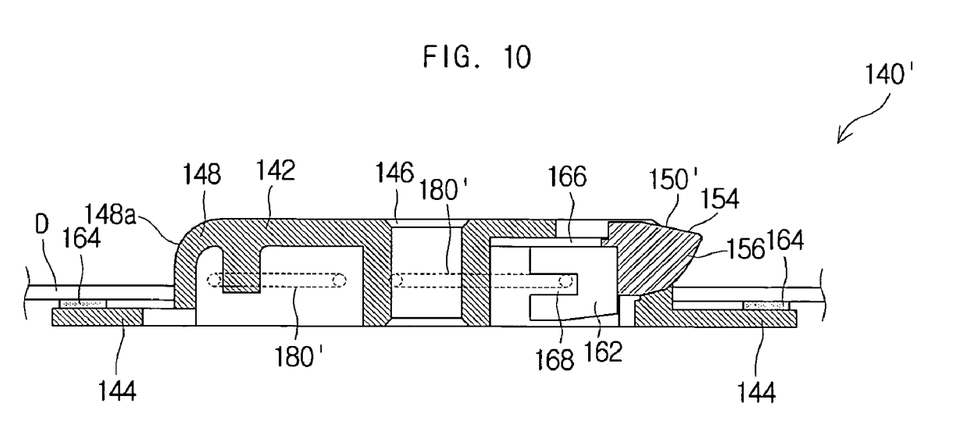
FIG. 10 is a cross-sectional view illustrating a disk chucking apparatus according to another embodiment of the invention.

FIG. 8 and FIG. 9 are plan views illustrating a disk chucking apparatus 140' according to another embodiment of the invention. FIG. 8 illustrates the chuck pins 150' protruding outwards, while FIG. 9 illustrates the chuck pins 150' contracted inwards in the chuck base 142. FIG. 10 is a cross-sectional view illustrating the disk chucking apparatus 140' of FIG. 8.

Except that the elastic members 180' are torsion springs of circular ring type and securing grooves 174 are formed in the pressing surfaces 162 of the chuck pins 150', the elements of this embodiment are substantially the same as or similar to the disk chucking apparatus 140 of the previously described embodiment. Therefore, the description for this particular embodiment will focus more on the different elements.

The elastic members 180' may be circular ring type torsion springs, and may have circular or polygonal cross-sections. An elastic member 180' may be positioned adjacent to elastic pieces 148 and may press the pair of adjacent chuck pins 150' concurrently. A securing groove may be formed in each pressing surface 162 of the elastic members 180' touching a chuck pin 150'. A portion of the elastic member 180' may be inserted into the securing groove, to prevent the elastic member 180 from slipping on the pressing surface 162.

As the elastic member 180' presses the adjacent chuck pins at once in the disk chucking apparatus according to this embodiment, the differences in the moduli of elasticity of the elastic members 180' can be cancelled out.

Figure 11:
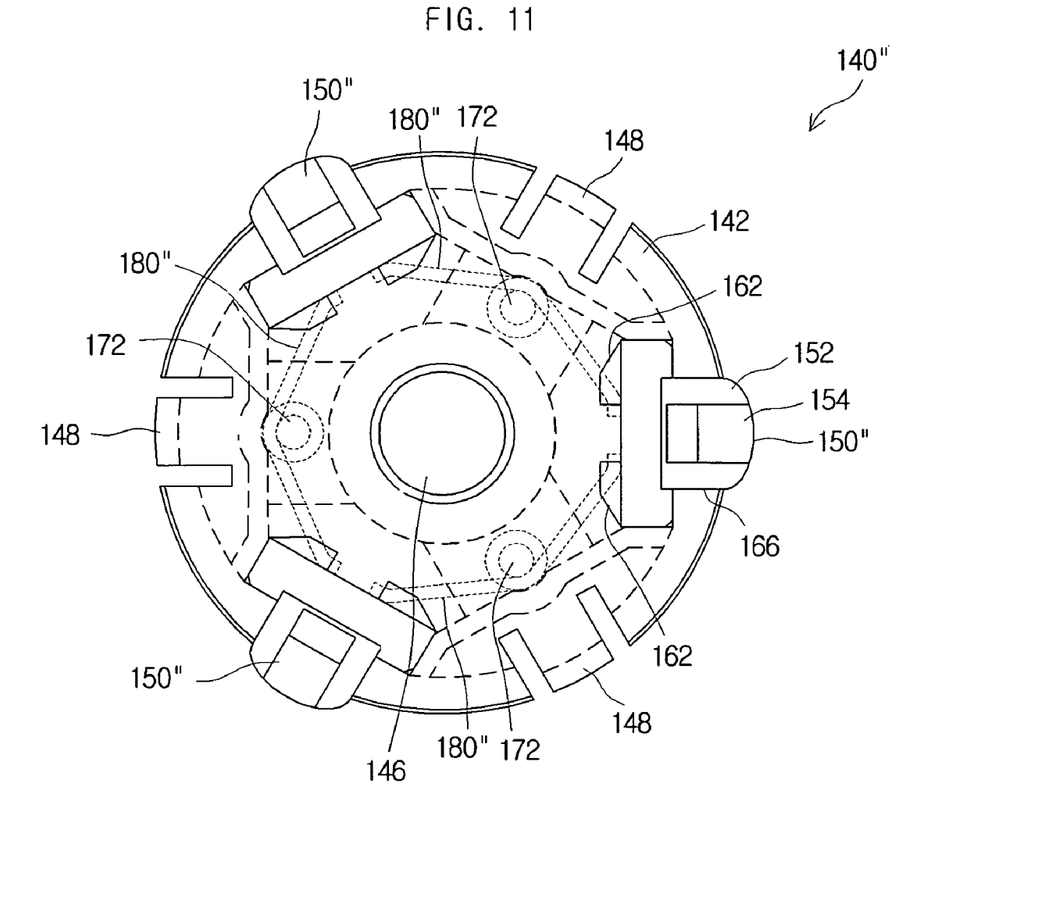
FIG. 11 is a plane view illustrating chuck pins protruding outwards in a disk chucking apparatus according to yet another embodiment of the invention.
Figure 12:
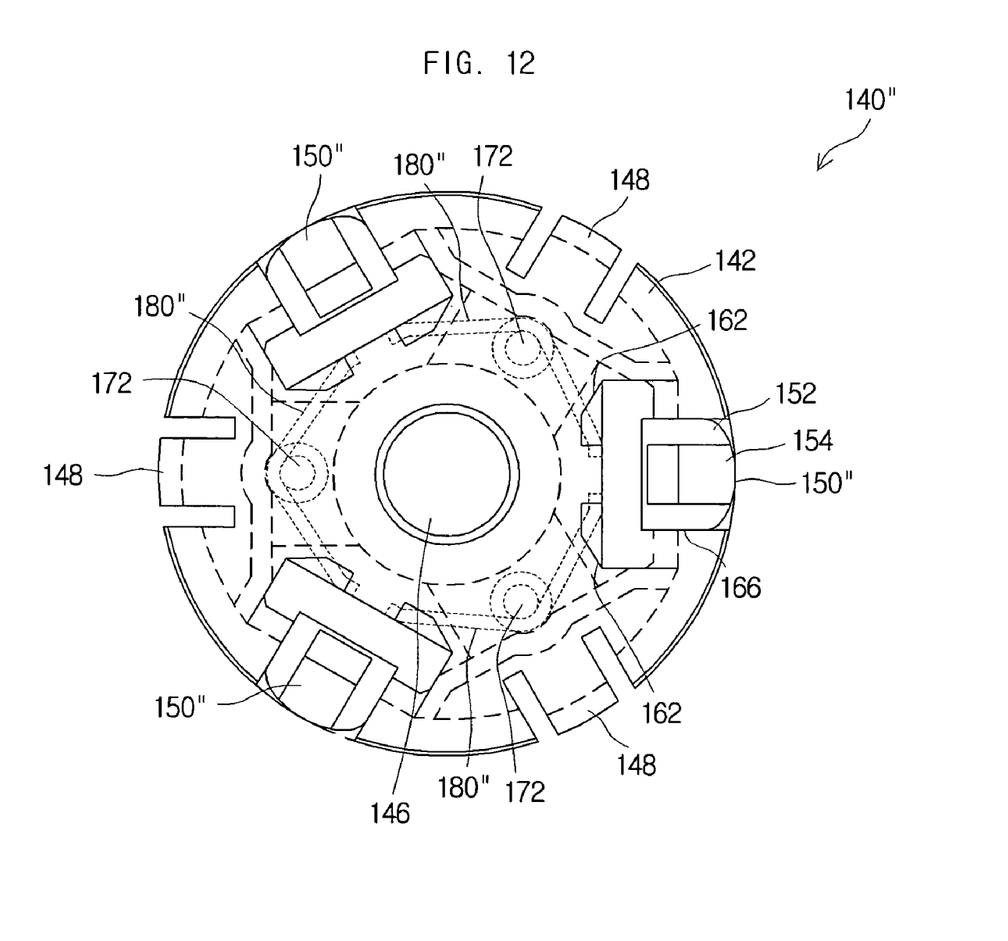
FIG. 12 is a plane view illustrating chuck pins inserted inwards in a disk chucking apparatus according to yet another embodiment of the invention.
Figure 13:
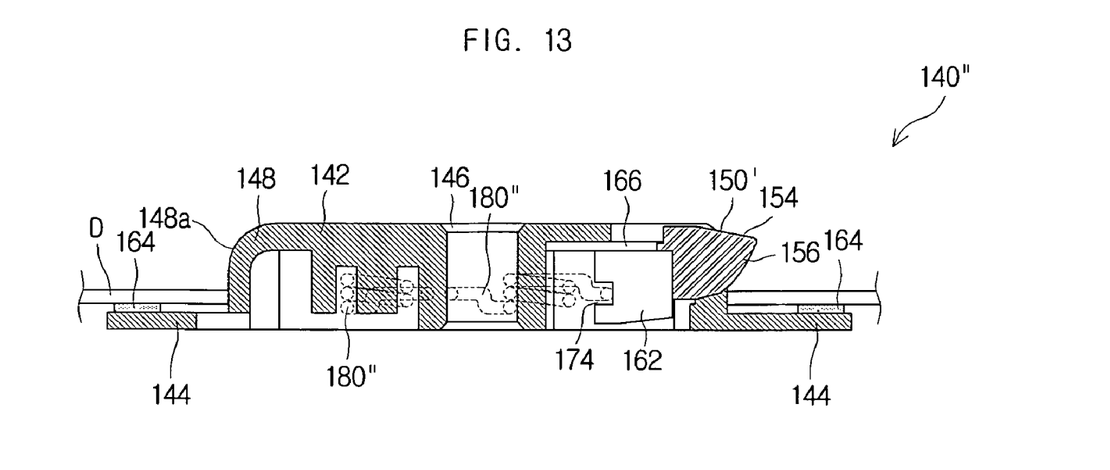
FIG. 13 is a cross-sectional view illustrating a disk chucking apparatus according to yet another embodiment of the invention.

FIG. 11 and FIG. 12 are plan views of a disk chucking apparatus according to yet another embodiment of the invention. FIG. 11 illustrates the chuck pins 150" protruding outwards, while FIG. 12 illustrates the chuck pins 150" contracted inwards in the chuck base 142. FIG. 13 is a cross-sectional view illustrating the disk chucking apparatus 140" of FIG. 11.

Except that elastic members 180" are torsion springs of helical coil type and securing grooves 174 are formed in the pressing surfaces 162 of the chuck pins 150", the elements of this embodiment are substantially the same as or similar to the disk chucking apparatus 140 of the previously described embodiments. Therefore, the description for this particular embodiment will focus more on the different elements.

The elastic members 180" may be helical coil type torsion springs. A securing protrusion 172 may be inserted through and secured in the center of a torsion spring, while each end of an elastic member 180" may be inserted in the securing groove 174 of an adjacent chuck pin 150". Hence, both ends of the elastic member 180" can press the adjacent chuck pins 150" simultaneously, to cancel out the differences in elasticity between elastic members to a certain degree.

While helical compression springs, circular ring type torsion springs, and helical coil type springs have been provided as examples of elastic members, the invention is not thus limited, and other types of elastic members may be used, such as Belleville or curved type spring washers, etc.

As set forth above, certain aspects of the invention may provide a disk chucking apparatus or a disk drive equipped with the disk chucking apparatus, in which the center of the disk and the center of the chuck base can be aligned with greater ease. Certain aspects of the invention may also provide a disk chucking apparatus or a disk drive equipped with the disk chucking apparatus having greater durability.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:
1. A disk chucking apparatus comprising:
  a chuck base having a plurality of holding portions;
  a plurality of chuck pins inserted in the holding portions such that the chuck pins protrude outwards from the chuck base; and
  a plurality of elastic members elastically supporting the chuck pins,
  wherein each of the elastic members elastically supports a pair of adjacent chuck pins concurrently.

2. The disk chucking apparatus of claim 1, wherein the chuck pin comprises:
a contact portion protruding outwards from the holding portion to be in contact with a disk; and
a body portion contacting the elastic member.

3. The disk chucking apparatus of claim 2, wherein the contact portion comprises:
an upper inclined portion; and
a lower inclined portion formed in connection with the upper inclined portion.

4. The disk chucking apparatus of claim 2, wherein the body portion comprises a pair of pressing surfaces contacting the elastic member at an angle with respect to a direction of motion of the chuck pin.

5. The disk chucking apparatus of claim 4, wherein the pressing surfaces are symmetrical with respect to the direction of motion of the chuck pin.

6. The disk chucking apparatus of claim 1, wherein the chuck base comprises a center hole through which a shaft is inserted,
and wherein the holding portions are formed around the center hole in equal intervals.

7. The disk chucking apparatus of claim 1, wherein the chuck base comprises a center hole through which a shaft is inserted,
and wherein an elastic piece is formed at a position symmetrical with the holding portion about the center hole.

8. The disk chucking apparatus of claim 7, wherein the elastic piece comprises a bending portion having elasticity.

9. The disk chucking apparatus of claim 1, wherein the chuck base comprises a turntable,
and wherein a cushion member contacting a disk is formed on the turntable.

10. The disk chucking apparatus of claim 1, wherein the holding portions and the chuck pins inserted in the holding portions are formed in intervals of 120 degrees.

11. The disk chucking apparatus of claim 1, wherein the elastic member is a helical compression spring.

12. The disk chucking apparatus of claim 11, wherein both ends of the helical compression spring are each secured to one of the chuck pins.

13. The disk chucking apparatus of claim 1, wherein the elastic member is a torsion spring.

14. The disk chucking apparatus of claim 13, wherein the torsion spring is a circular type, and the chuck pin comprises a securing groove in which a portion of the torsion spring is inserted.

15. The disk chucking apparatus of claim 13, wherein the torsion spring is a helical coil type, and the chuck pin comprises a securing groove in which a portion of the torsion spring is inserted.

16. A disk chucking apparatus comprising:
a chuck base having a plurality of holding portions;
a plurality of chuck pins inserted in the holding portions such that the chuck pins protrude outwards from the chuck base; and
a plurality of elastic member elastically supporting the chuck pins,
wherein each of the chuck pins is pressed by a pair of adjacent elastic members concurrently.

17. The disk chucking apparatus of claim 16, wherein the chuck pin comprises:
a contact portion protruding outwards from the holding portion to be in contact with a disk; and
a body portion contacting the elastic member.

18. The disk chucking apparatus of claim 17, wherein the contact portion comprises:
an upper inclined portion; and
a lower inclined portion formed in connection with the upper inclined portion.

19. The disk chucking apparatus of claim 17, wherein the body portion comprises a pair of pressing surfaces contacting the elastic member at an angle with respect to a direction of motion of the chuck pin.

20. The disk chucking apparatus of claim 19, wherein the pressing surfaces are symmetrical with respect to the direction of motion of the chuck pin.

21. The disk chucking apparatus of claim 16, wherein the chuck base comprises a center hole through which a shaft is inserted,
and wherein the holding portions are formed around the center hole in equal intervals.

22. The disk chucking apparatus of claim 16, wherein the chuck base comprises a center hole through which a shaft is inserted,
and wherein an elastic piece is formed at a position symmetrical with the holding portion about the center hole.

23. The disk chucking apparatus of claim 22, wherein the elastic piece comprises a bending portion having elasticity.

24. The disk chucking apparatus of claim 16, wherein the chuck base comprises a turntable,
and wherein a cushion member contacting a disk is formed on the turntable.

25. The disk chucking apparatus of claim 16, wherein the holding portions and the chuck pins inserted in the holding portions are formed in intervals of 120 degrees.

26. The disk chucking apparatus of claim 16, wherein the elastic member is a helical compression spring.

27. The disk chucking apparatus of claim 26, wherein both ends of the helical compression spring are each secured to one of the chuck pins.

28. The disk chucking apparatus of claim 16, wherein the elastic member is a torsion spring.

29. The disk chucking apparatus of claim 28, wherein the torsion spring is a circular type, and the chuck pin comprises a securing groove in which a portion of the torsion spring is inserted.

30. The disk chucking apparatus of claim 28, wherein the torsion spring is a helical coil type, and the chuck pin comprises a securing groove in which a portion of the torsion spring is inserted.

31. A disk drive comprising a disk chucking apparatus and a motor configured to provide a rotating force to the disk chucking apparatus, wherein the disk chucking apparatus comprises:
a chuck base having a plurality of holding portions and provided with a rotating force by the motor;
a plurality of chuck pins inserted in the holding portions such that the chuck pins protrude outwards from the chuck base; and
a plurality of elastic members elastically supporting the chuck pins,
wherein each of the elastic members elastically supports a pair of adjacent chuck pins concurrently.

32. A disk drive comprising a disk chucking apparatus and a motor configured to provide a rotating force to the disk chucking apparatus, wherein the disk chucking apparatus comprises:
a chuck base having a plurality of holding portion and provided with a rotating force by the motor;

a plurality of chuck pins inserted in the holding portions such that the chuck pins protrude outwards from the chuck base; and a plurality of elastic member elastically supporting the chuck pins, wherein each of the chuck pins is pressed by a pair of adjacent elastic members concurrently.

* * * * *